(12) United States Patent
Xu et al.

(10) Patent No.: US 11,714,216 B2
(45) Date of Patent: Aug. 1, 2023

(54) DISPLAY PANEL, MANUFACTURING METHOD THEREOF, DISPLAY DEVICE

(71) Applicant: Shenzhen China Star Optoelectronics Semiconductor Display Technology Co., Ltd., Shenzhen (CN)

(72) Inventors: Jian Xu, Shenzhen (CN); Linfeng Liu, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 885 days.

(21) Appl. No.: 16/627,799

(22) PCT Filed: Dec. 19, 2019

(86) PCT No.: PCT/CN2019/126450
§ 371 (c)(1),
(2) Date: Dec. 31, 2019

(87) PCT Pub. No.: WO2021/114338
PCT Pub. Date: Jun. 17, 2021

(65) Prior Publication Data
US 2021/0356631 A1    Nov. 18, 2021

(30) Foreign Application Priority Data
Dec. 9, 2019    (CN) .......................... 201911251471.9

(51) Int. Cl.
*G09G 3/20*    (2006.01)
*G02B 5/00*    (2006.01)

(52) U.S. Cl.
CPC .................................. *G02B 5/003* (2013.01)

(58) Field of Classification Search
CPC . G02B 5/003; G02B 5/00; G09G 3/20; G09G 2300/0426; G02F 1/133512;
(Continued)

(56) References Cited

U.S. PATENT DOCUMENTS 9,829,755 B1 * 11/2017 Tae ................... G02F 1/134309
10,872,938 B2 * 12/2020 Cheng ....................... G09G 3/32
(Continued)

FOREIGN PATENT DOCUMENTS

| CN | 205334901 | 6/2016 |
| CN | 105911744 | 8/2016 |

(Continued)

*Primary Examiner* — Balram T Parbadia
(74) *Attorney, Agent, or Firm* — PV IP PC; Wei Te Chung; Zhigang Ma

(57) ABSTRACT

The present application provides a display panel, a manufacturing method of the display panel, and a display device. The display panel includes a display region and a non-display region. The display panel includes multiple pixels divided by a boundary line. Each pixel has corresponding area uniformity. The pixels include multiple first pixels having the area uniformity within a first predetermined range. The pixels also include multiple second pixels having the area uniformity outside the first predetermined range. A shielding block is arranged on the first pixel. Brightness of the second pixel is set according to an area of the second pixel in the display region.

17 Claims, 3 Drawing Sheets

(58) Field of Classification Search
CPC .............. G02F 2201/56; G02F 1/1343; G02F 1/134309; G09F 9/00; G09F 9/35
See application file for complete search history.

(56) References Cited

U.S. PATENT DOCUMENTS

| | | | | |
|---|---|---|---|---|
| 11,468,824 | B2* | 10/2022 | Sun .......................... | G09G 3/22 |
| 2010/0020277 | A1* | 1/2010 | Morita .............. | G02F 1/133512 |
| | | | | 349/110 |
| 2016/0120005 | A1* | 4/2016 | Wu ........................ | H05B 33/22 |
| | | | | 313/505 |
| 2016/0178940 | A1* | 6/2016 | Yuan ................ | G02F 1/133514 |
| | | | | 359/893 |
| 2018/0130397 | A1* | 5/2018 | Zheng .................... | G09G 3/207 |
| 2018/0151612 | A1* | 5/2018 | Zheng ................. | G09G 3/3611 |
| 2019/0088709 | A1* | 3/2019 | Zeng ...................... | H10K 59/00 |
| 2019/0305057 | A1* | 10/2019 | Cheng ................ | H01L 51/5036 |
| 2020/0035141 | A1* | 1/2020 | Yang ........................ | G09G 3/20 |
| 2020/0202817 | A1* | 6/2020 | Li ............................ | G09G 5/30 |
| 2021/0358432 | A1* | 11/2021 | Chen ................ | G02F 1/133512 |
| 2021/0367002 | A1* | 11/2021 | Deng ................... | H10K 50/865 |

FOREIGN PATENT DOCUMENTS

| | | |
|---|---|---|
| CN | 106340249 | 1/2017 |
| CN | 106707606 | 5/2017 |
| CN | 107526201 | 12/2017 |
| CN | 107886840 | 4/2018 |
| CN | 107887424 | 4/2018 |
| CN | 108010952 | 5/2018 |
| CN | 108364568 | 8/2018 |
| CN | 108648677 | 10/2018 |
| CN | 108806639 | 11/2018 |
| CN | 108828851 | 11/2018 |
| CN | 108962122 | 12/2018 |
| CN | 109119447 | 1/2019 |
| CN | 109616502 | 4/2019 |
| CN | 109727525 | 5/2019 |
| JP | 2018-107580 | 7/2018 |
| TW | 201835885 | 10/2018 |

* cited by examiner

DISPLAY PANEL, MANUFACTURING METHOD THEREOF, DISPLAY DEVICE

RELATED APPLICATIONS

This application is a National Phase of PCT Patent Application No. PCT/CN2019/126450 having International filing date of Dec. 19, 2019, which claims the benefit of priority of Chinese Patent Application No. 201911251471.9 filed on Dec. 9, 2019. The contents of the above applications are all incorporated by reference as if fully set forth herein in their entirety.

FIELD AND BACKGROUND OF THE INVENTION

The present application relates to a field of display technology, particularly to manufacturing of a display device, and specifically to a display panel, a manufacturing method thereof, and a display device.

At present, compared with conventional rectangular displays, special-shaped displays can better adapt to the overall structure of a building and the surrounding environment, and can surround components such as cameras to increase screen ratios of the displays.

However, conventional pixels are basically rectangular, so an edge of the pixel located at an edge of the special-shaped display cannot be matched with the edge of the special-shaped display, so that jagged images appear at the edge of the special-shaped display, and as a result, image display quality of the display is lowered.

Therefore, it is necessary to provide a display panel, a manufacturing method thereof, and a display device which can improve the jagged images at the edge of the special-shaped display so as to improve the image display quality of the display panel.

SUMMARY OF THE INVENTION

The present application provides a display panel, a manufacturing method thereof, and a display device. The display panel is divided by a boundary line into a display region and a non-display region. Each of pixels divided by the boundary line comprises a plurality of sub-pixels. According to areas of the sub-pixels in the display region, each pixel has corresponding area uniformity. According to whether the area uniformity is within a first predetermined range, a shielding block is arranged on the pixel, or brightness of the pixel is set according to an area of the pixel in the display region. This way, the present application solves a problem that jagged images appear at an edge of a special-shaped display, and improves the display quality of the display panel.

The present application provides a display panel comprising a display region and a non-display region, the display region and the non-display region separated by a boundary line, the display panel comprising:

a substrate;

a plurality of pixels disposed on the substrate, wherein the pixels are divided by the boundary line, a portion of each of the pixels is disposed in the display region, the other portion of each of the pixels is disposed in the non-display region, each of the pixels comprises a plurality of sub-pixels, and each of the sub-pixels has an area located in the display region, so that each pixel has corresponding area uniformity;

the pixels comprising:

a plurality of first pixels, wherein the area uniformity of the first pixel is within a first predetermined range, and a shielding block is disposed on the first pixel; and a plurality of second pixels, wherein the area uniformity of the second pixel is outside the first predetermined range, and brightness of the second pixel is set according to an area of the second pixel in the display region.

According to one embodiment of the present application, the area uniformity of the pixel is $[1-(S1-S2)/(S1+S2)]$, wherein S1 is an area of a first sub-pixel in the display region, S2 is an area of a second sub-pixel in the display region, the first sub-pixel of each pixel is the sub-pixel having a largest area in the display region, and the second sub-pixel of each pixel is the sub-pixel having a smallest area in the display region.

According to one embodiment of the present application, the first predetermined range is greater than 0.7 and less than or equal to 1.

According to one embodiment of the present application, at least a portion of each of the shielding blocks is disposed in the non-display region, the shielding block shields the first pixel by using S/M as a minimum unit, wherein S is an area of the first pixel, and M is within a second predetermined range.

According to one embodiment of the present application, the second predetermined range is between 4, 9, or 16.

According to one embodiment of the present application, a section where the shielding block on the boundary line is a minimum unit has a target ratio, the target ratio is an area of the corresponding section in the display region to an area of the corresponding section in the non-display region, and the target ratio of the section is less than 1.

According to one embodiment of the present application, each of the first pixels has area uniformity, and the area uniformity of the first pixels is $[1-(S3-S4)/(S3+S4)]$, wherein S3 is an area of a third sub-pixel unshielded by the shielding block, and S4 is an area of a fourth sub-pixel unshielded by the shielding block, wherein the third sub-pixel is the sub-pixel of the corresponding first pixel, which has a largest area unshielded by the shielding block, wherein the fourth sub-pixel is the sub-pixel of the corresponding first pixel, which has a smallest area unshielded by the shielding block.

According to one embodiment of the present application, the area uniformity of the first pixel is greater than 0.9 and less than or equal to 1.

The present application further provides a display device, the display device comprising a display panel, the display panel comprising a display region and a non-display region, the display region and the non-display region separated by a boundary line, the display panel comprising:

a substrate;

a plurality of pixels disposed on the substrate, wherein the pixels are divided by the boundary line, a portion of each of the pixels is disposed in the display region, the other portion of each of the pixels is disposed in the non-display region, each of the pixels comprises a plurality of sub-pixels, and each of the sub-pixels has an area located in the display region, so that each pixels have corresponding area uniformity;

the pixels comprising:

a plurality of first pixels, wherein the area uniformity of the first pixel is within a first predetermined range, and a shielding block is disposed on the first pixel; and a plurality of second pixels, wherein the area uniformity of the second pixel is outside the first predetermined range, and brightness of the second pixel is set according to an area of the second pixel in the display region.

According to one embodiment of the present application, the area uniformity of the pixel is [1−(S1−S2)/(S1+S2)], wherein S1 is an area of a first sub-pixel in the display region, S2 is an area of a second sub-pixel in the display region, the first sub-pixel of each pixel is the sub-pixel having a largest area in the display region, and the second sub-pixel of each pixel is the sub-pixel having a smallest area in the display region.

According to one embodiment of the present application, the first predetermined range is greater than 0.7 and is less than or equal to 1.

According to one embodiment of the present application, at least a portion of each of the shielding blocks is disposed in the non-display region, and the shielding block shields the first pixel by using S/M as a minimum unit, wherein S is an area of the first pixel, and M is within a second predetermined range.

According to one embodiment of the present application, the second predetermined range is a range between 4, 9, or 16.

According to one embodiment of the present application, a section where the shielding block on the boundary line is a minimum unit has a target ratio, the target ratio is an area of the corresponding section in the display region to an area of the corresponding section in the non-display region, and the target ratio of the section is less than 1.

According to one embodiment of the present application, each of the first pixels has area uniformity, and the area uniformity of the first pixel is [1−(S3−S4)/(S3+S4)], wherein S3 is an area of a third sub-pixel unshielded by the shielding block, and S4 is an area of a fourth sub-pixel unshielded by the shielding block, wherein the third sub-pixel is the sub-pixel of the corresponding first pixel, which has a largest area unshielded by the shielding block, wherein the fourth sub-pixel is the sub-pixel of the corresponding first pixel, which has a smallest area unshielded by the shielding block.

According to one embodiment of the present application, the area uniformity of the first pixel is greater than 0.9 and is less than or equal to 1.

The present application further provides a manufacturing method of a display panel, the display panel comprising a display region and a non-display region, the display region and the non-display region separated by a boundary line, the manufacturing method comprising:

providing a substrate;

forming a plurality of pixels on the substrate, wherein the pixels are divided by the boundary line, a portion of each of the pixels is formed in the display region, the other portion of each of the pixels is formed in the non-display region, each of the pixels comprises a plurality of sub-pixels, and each of the sub-pixels has an area located in the display region, so that each pixel has corresponding area uniformity;

determining whether the area uniformity of the pixel is within a first predetermined range;

if it is determined that the area uniformity of the pixel is within the first predetermined range, defining the pixel as a first pixel, and forming a shielding block on the first pixel; and if it is determined that the area uniformity of the pixel is outside the first predetermined range, defining the pixel as a second pixel, and setting brightness of the second pixel according to an area of the second pixel in the display region.

According to one embodiment of the present application, the area uniformity of the pixel is related to an area of the first pixel of the pixel in the display region and an area of the second pixel of the pixel in the display region, the first sub-pixel of each pixel is the sub-pixel having a largest area in the display region, and the second sub-pixel of each pixel is the sub-pixel having a smallest area in the display region.

According to one embodiment of the present application, the area uniformity of the pixel is [1−(S1−S2)/(S1−S2)], wherein S1 is an area of the first sub-pixel in the display region, and S2 is an area of the second sub-pixel in the display region.

According to one embodiment of the present application, the first predetermined range is greater than 0.7 and is less than or equal to 1.

The present application provides a display panel, a manufacturing method thereof, and a display device. The display panel is divided by a boundary line into a display region and a non-display region. Each of pixels divided by the boundary line comprises a plurality of sub-pixels. According to areas of the sub-pixels in the display region, each pixel has corresponding area uniformity. According to whether the area uniformity is within a first predetermined range, a shielding block is arranged on the pixel, or brightness of the pixel is set according to an area of the pixel in the display region. This way, the present application solves a problem that jagged images appear at an edge of a special-shaped display, and improves the display quality of the display panel.

BRIEF DESCRIPTION OF THE SEVERAL VIEWS OF THE DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work.

DESCRIPTION OF SPECIFIC EMBODIMENTS OF THE INVENTION

Figure 1:
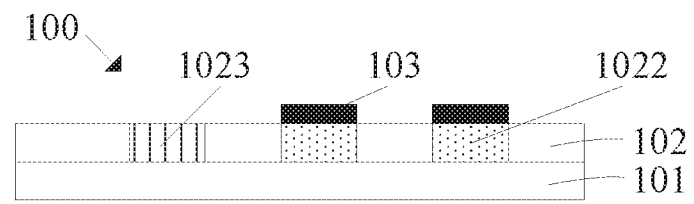
FIG. 1 is a schematic cross-sectional view illustrating a display panel according to one embodiment of the present application.

Technical solutions of the present application will be clearly and completely described below in conjunction with embodiments with reference to the accompanying drawings. Obviously, the embodiments are only a part of the embodiments of the present application, but not all the embodiments. Based on the embodiments in the present application, all other embodiments obtained by those skilled in the art without creative work fall into the protection scope of the present application.

In the present disclosure, it should be understood that directional terms such as "on" and "below" are based on the orientation or position relationship shown in the drawings, wherein "on" simply means that an element referred to is on top of an object, and can be directly above, obliquely above, on an upper surface of the object, as long as the element is higher than a level of the object. The above orientations or positional relationships are only for ease of description, and do not indicate or imply that the device or element referred to must have a specific orientation, constructed or operated in a specific orientation, and therefore cannot be construed as limiting the application.

In addition, it should be noted that the accompanying drawings only illustrate structures and steps that are closely related to the present application, and omit some details that are not closely related to the application. The purpose is to simplify the drawings, rather than indicating that the actual device and method are exactly the same as those in the drawings, and the drawings are not intended to limit the actual device and method. The same reference numerals indicate the same structures throughout the present disclosure.

Reference to "embodiment" herein means that a particular feature, structure, or characteristic described in connection with the embodiment may be included in at least one embodiment of the present application. The phrase appears in various places in the specification are not necessarily all referring to the same embodiment, nor are they independent or alternative embodiments that are mutually exclusive with other embodiments. Those skilled in the art can understand explicitly or implicitly that the embodiments described herein may be combined with other embodiments.

The present application provides a display device. The display device includes a display panel as shown in FIGS. 1 and 2.

Figure 2:
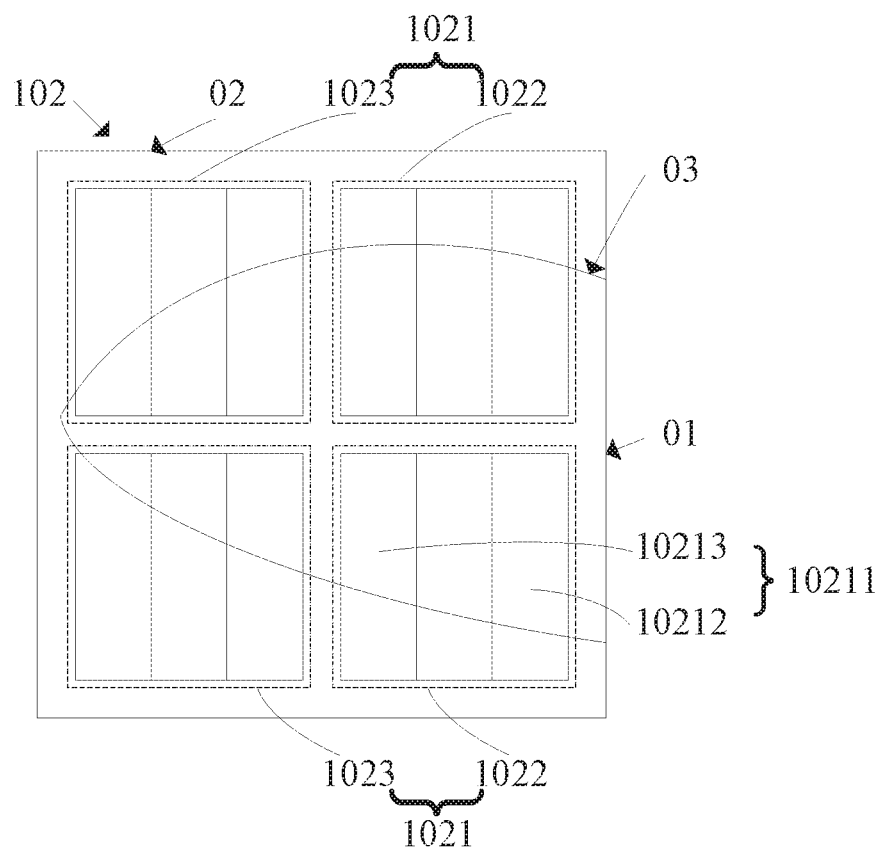
FIG. 2 is a schematic top view illustrating a pixel layer according to one embodiment of the present application.

According to one embodiment, as shown in FIGS. 1 and 2, the display panel 100 comprises a substrate 101 and a pixel layer 102 disposed on the substrate 101. The display panel 100 comprises a display region 01 and a non-display region 02. The display region 01 and the non-display region 02 are separated by a boundary line 03. The pixel layer 102 comprises a plurality of pixels 1021, wherein the pixels 1021 are divided by the boundary line 03, a portion of each pixel 1021 is disposed in the display region 01, the other portion of each pixel 1021 is disposed in the non-display region 02.

As shown in FIG. 2, each of the pixels 1021 comprises a plurality of sub-pixels 10211, and each of the sub-pixels 10211 has an area located in the display region 01, so that each pixel 1021 has corresponding area uniformity.

Figure 3:
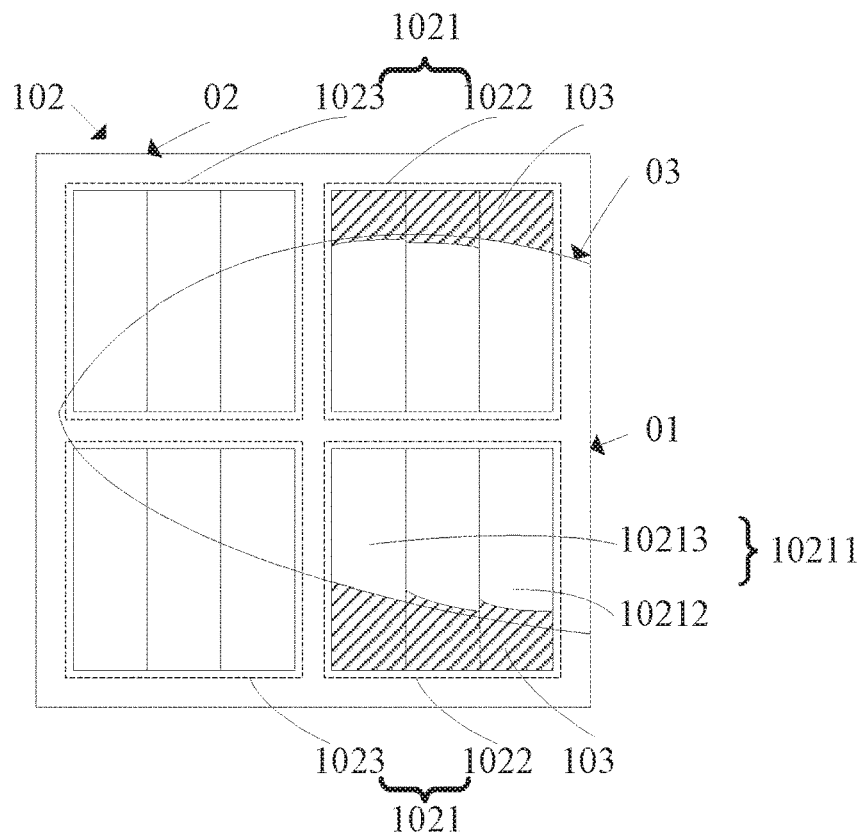
FIG. 3 is a schematic top view illustrating the pixel layer shielded by a shielding block according to one embodiment of the present application.

As shown in FIG. 3, the pixels 1021 comprise a plurality of first pixels 1022 and a plurality of second pixels 1023. The area uniformity of the first pixel is within a first predetermined range, and a shielding block 103 is disposed on the first pixel 1022. The area uniformity of the second pixel 1023 is outside the first predetermined range, and brightness of the second pixel 1023 is set according to an area of the second pixel 1023 in the display region 02.

The area uniformity of the pixel 1021 is $[1-(S1-S2)/(S1+S2)]$, wherein S1 is an area of a first sub-pixel 10212 in the display region, S2 is an area of a second sub-pixel 10213 in the display region, the first sub-pixel 10212 of each pixel is the sub-pixel 10211 having a largest area in the display region 01, and the second sub-pixel 10213 of each pixel is the sub-pixel 10211 having a smallest area in the display region 01.

According to one embodiment of the present application, the first predetermined range is greater than 0.7 and is less than or equal to 1. This means that the areas of the sub-pixels 10211 in the first pixel 1022 in the display region 01 have relatively small differences. Typically, colors of the sub-pixels 10211 in the same first pixel 1022 are different. When the area uniformity is greater than 0.7 and less than or equal to 1, it indicates that the first pixel 1022 have similar proportions of the sub-pixels of different colors, so there are no large color shift problems, and properties of the shielding block 103 are uniform throughout, which facilitates the use of the shielding block 103 on the first pixel 1022 to improve the jagged images at an edge of a special-shaped display.

According to one embodiment of the present application, at least a portion of each of the shielding blocks 103 is disposed in the non-display region 02, the shielding block 103 shields the first pixel 1022 by using S/M as a minimum unit, wherein S is an area of the first pixel 1022, and M is within a second predetermined range.

According to one embodiment of the present application, the second predetermined range is between 4, 9, or 16. For example, when M is 9, the shielding block 103 shields the first pixel 1022 by using S/9 as the minimum unit. In other words, the minimum area of the shielding block 103 can be S/9. Accordingly, the area of the shielding block 103 can also be $[(2*S)/9]$, $[(3*S)/9]$, $[(3*S)/9]$, and so on. It can be understood that precision of the shielding block 103 shielding the first pixel 1022 is S/9.

According to one embodiment of the present application, a section where the shielding block 103 on the boundary line 03 is a minimum unit has a target ratio, the target ratio is an area of the corresponding section in the display region 01 to an area of the corresponding section in the non-display region 02, and the target ratio of the section is less than 1.

The above configuration can slightly increase light transmittance of the display panel while shielding the non-display region 02.

According to one embodiment, each sub-pixel of the first pixel 1022 has an area that is not shielded by the shielding block 103, so that the first pixel 1022 has the corresponding area uniformity. The area uniformity of the first pixel 1022 is related to areas of a third sub-pixel and a fourth sub-pixel in the first pixel 1022 in the display region 01. The third sub-pixel is the sub-pixel of the corresponding first pixel 1022, which has a largest area unshielded by the shielding block 103. The fourth sub-pixel is the sub-pixel of the corresponding first pixel 1022, which has a smallest area unshielded by the shielding block 103. The area uniformity of the first pixel 1022 is $[1-(S3-S4)/(S3+S4)]$, wherein S3 is an area of the third sub-pixel unshielded by the shielding block 103, and S4 is an area of the fourth sub-pixel unshielded by the shielding block 103. The area uniformity of the first pixel is greater than 0.9 and less than or equal to 1.

A range of the area uniformity of the first pixel 1022 is smaller than the area uniformity of the pixel, which means that areas of the sub-pixels 10211 in the first pixel 1022 unshielded by the shielding block 103 have small differences. By means of the above configuration of the shielding block 103, a color shift problem at the edge of the special-shaped display can be improved.

According to one embodiment of the present application, the third sub-pixel can be the first sub-pixel 10212, and the fourth sub-pixel can be the second sub-pixel 10213.

According to one embodiment of the present application, brightness of the second pixel 1023 can be increased according to an increase in the area of the second pixel 1023 in the display region 01. For example, for the second pixels 1023, a ratio of the brightness of each second pixel 1023 to the area of the second pixel 1023 in the display region 01 is equal. Further, the brightness of the second pixel 1023 can include brightness of each of the sub-pixels 10211, and the brightness of each of the sub-pixels 10211 can be set according to the area of the sub-pixel 10211 in the display region 01. For example, the brightness of each of the sub-pixels 10211 can be increased according to an increase in the area of the sub-pixel 10211 in the display region 01. A ratio of the brightness of each sub-pixel 10211 to an area of each sub-pixel in the display region 01 is equal. For more details, please refer to the following embodiments.

According to one embodiment of the present application, by controlling a magnitude of a driving voltage applied to each of the sub-pixels 10211 in the second pixel 1023, a magnitude of a grayscale value of each of the sub-pixels 10211 in the second pixel 1023 is controlled to provide different brightness levels.

According to one embodiment of the present application, by controlling an aperture size of a light filter arranged on the second pixel 1023, an amount of light transmitted through each of the sub-pixels 10211 in the second pixel 1023 is controlled to provide different brightness levels.

According to one embodiment of the present application, by controlling a length of each of the sub-pixels 10211 in the second pixel 1023, an amount of light emitted from or transmitted through each of the sub-pixels 10211 in the second pixel 1023 is controlled to provide different brightness levels.

Figure 4:
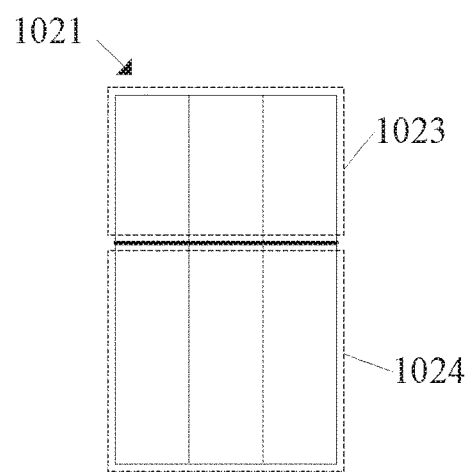
FIG. 4 is a schematic top view illustrating a pixel according to one embodiment of the present application.

It should be noted that, as shown in FIG. 4, the pixels 1021 comprises a main pixel 10214 and a subsidiary pixel 10215. The main pixel 10214 is disposed above the subsidiary pixel 10215, and a height of the main pixel 10214 is less than a height of the subsidiary pixel 10215. When the display panel 100 has low brightness, the main pixel 10214 and the sub-pixel 10215 in each of the pixels 1021 are respectively in an ON state and an OFF state. It can be understood that, for the pixel 1021 on the boundary line 03, if the boundary line is close to the main pixel 10214, burrs occur when the pixel 1021 uses the above-mentioned configuration for the second pixel 1023, so the pixel 1021 uses the above-mentioned configuration for the first pixel 1022.

The "low brightness" and "close" described in the present disclosure can be defined according to actual conditions.

Figure 5:
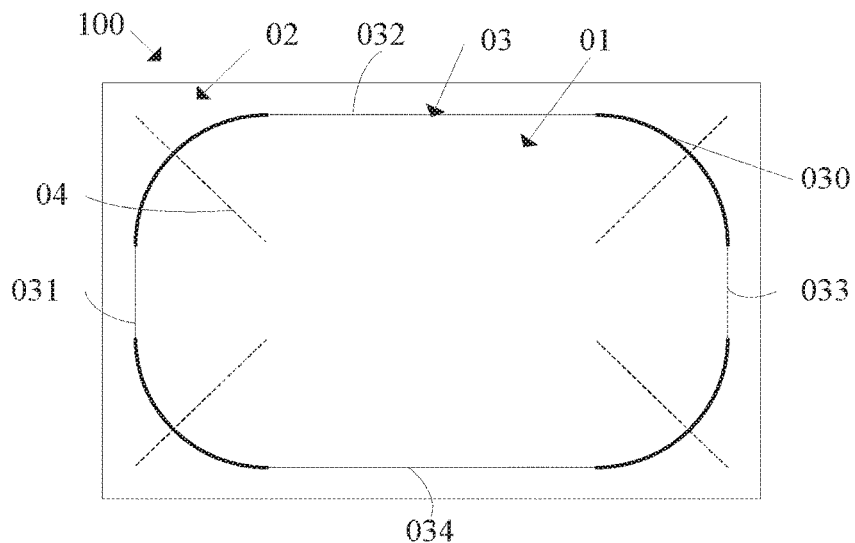
FIG. 5 is a schematic top view illustrating a display panel according to one embodiment of the present application.

In one embodiment of the present application, as shown in FIG. 5, the non-display region 02 in the display panel 100 is arranged around the display region 01, and the boundary line 03 used to separate the non-display region 02 and the display region 01 a closed curve. The boundary line 03 includes arcs 030 located at four corners of the display panel 100. The arc 030 can be a ¼ arc, a diagonal line 04 is used to divide the corresponding arc 030 into two equal parts, and the diagonal line 04 divides the boundary line 03 into a first sub-boundary line 031, a second sub-boundary line 032, a third sub-boundary line 033, and a fourth sub-boundary line 034, as shown in the drawing. In summary, the pixel 1021 on the first sub-boundary line 031 and the third sub-boundary line 033 can use the configuration for the second pixel 1023. The pixel 1021 on the second sub-boundary line 032 can use the configuration for the first pixel 1022. The pixel 1021 on the fourth sub-boundary line 034 can select the configuration for the first pixel 1022 or the second pixel 1023 according to a distance between the main pixel 10214 of the pixel 1021 and the fourth sub-boundary line 034.

Figure 6:
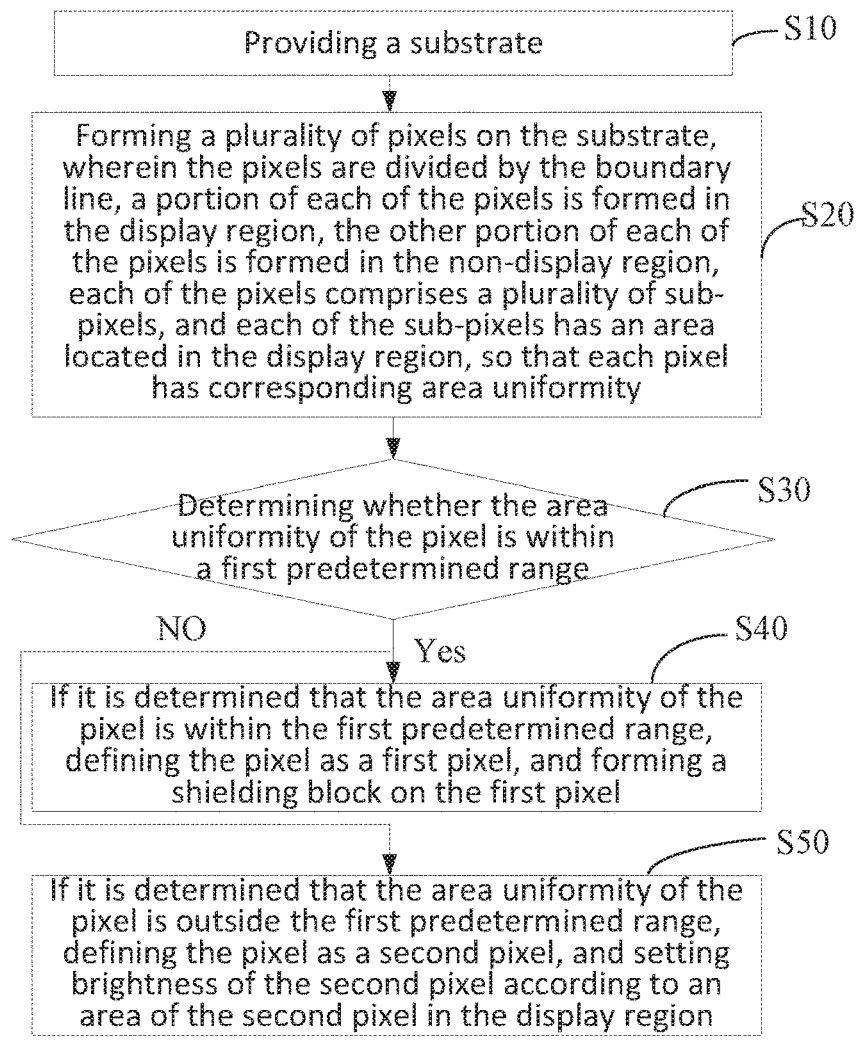
FIG. 6 is a process flow diagram illustrating a manufacturing method of a display panel according to one embodiment of the present application.

The present application provides a manufacturing method of a display panel 100. As shown in FIGS. 2, 3, and 5, the display panel 100 comprises a display region 01 and a non-display region 02. The display region 01 and the non-display region 02 are separated by a boundary line 03. As shown in FIG. 6, the manufacturing method comprises:

S10: providing a substrate 101.

The substrate 101 can be an array substrate. The array substrate includes a plurality of gate lines parallel to each other and a plurality of data lines parallel to each other. The gate lines and the data lines are intersected to form a plurality of pixel regions. A thin film transistor is disposed in the pixel region.

S20: forming a plurality of pixels 1021 on the substrate 101, wherein the pixels 1021 are divided by the boundary line 03, a portion of each of the pixels 1021 is formed in the display region 01, the other portion of each of the pixels 1021 is formed in the non-display region 02, each of the pixels 1021 comprises a plurality of sub-pixels 10211, and each of the sub-pixels 10211 has an area located in the display region 01, so that each pixel 1021 has corresponding area uniformity.

The pixel 1021 is electrically connected to a source or a drain of the thin film transistor, the gate line controls an ON/OFF state of the corresponding thin film transistor, and the data line inputs a data signal to the corresponding thin film transistor to control the corresponding pixel 1021 to display images.

According to one embodiment of the present application, the area uniformity of the pixel 1021 is $[1-(S1-S2)/(S1+S2)]$, wherein S1 is an area of a first sub-pixel 10212 in the display region, S2 is an area of a second sub-pixel 10213 in the display region, the first sub-pixel 10212 of each pixel 1021 is the sub-pixel having a largest area in the display region 01, and the second sub-pixel 10213 of each pixel 1021 is the sub-pixel having a smallest area in the display region 01.

In detail, an area of each of the first sub-pixels 10212 in the display region 01 can be obtained. An area S1 of the first sub-pixel 10212 in the display region and an area S2 of the second sub-pixel 10213 in the display region are obtained to calculate the area uniformity of the first sub-pixel 10212.

S30: determining whether the area uniformity of the pixel 1021 is within a first predetermined range.

In one embodiment of the present application, the first predetermined range is greater than 0.7 and less than or equal to 1. This means that the areas of the sub-pixels 10211 in the first pixel 1022 in the display region 01 have relatively small differences. Typically, colors of the sub-pixels 10211 in the same first pixel 1022 are different. When the area uniformity is greater than 0.7 and less than or equal to 1, it indicates that the first pixel 1022 have similar proportions of the sub-pixels of different colors.

S40: if it is determined that the area uniformity of the pixel 1021 is within the first predetermined range, defining the pixel 1021 as a first pixel 1022, and forming a shielding block 103 on the first pixel 1022.

It can be understood that, if the area uniformity of the pixel 1021 is within the first predetermined range, there are no large color shift problems, and properties of the shielding block 103 are uniform throughout, which facilitates the use of the shielding block 103 on the first pixel 1022 to improve the jagged images at an edge of a special-shaped display, as shown in FIG. 3.

According to one embodiment of the present application, at least a portion of each of the shielding blocks 103 is disposed in the non-display region 02, the shielding block 103 shields the first pixel 1022 by using S/M as a minimum unit, wherein S is an area of the first pixel 1022, and M is within a second predetermined range.

According to one embodiment of the present application, the second predetermined range is between 4, 9, or 16. For example, when M is 9, the shielding block 103 shields the first pixel 1022 by using S/9 as the minimum unit. In other words, the minimum area of the shielding block 103 can be S/9. Accordingly, the area of the shielding block 103 can also be [(2*S)/9], [(3*S)/9], [(3*S)/9], and so on. It can be understood that precision of the shielding block 103 shielding the first pixel 1022 is S/9.

According to one embodiment of the present application, a section where the shielding block 103 on the boundary line 03 is a minimum unit has a target ratio, the target ratio is an area of the corresponding section in the display region 01 to an area of the corresponding section in the non-display region 02, and the target ratio of the section is less than 1. The above configuration can slightly increase light transmittance of the display panel while shielding the non-display region 02.

According to one embodiment, each sub-pixel of the first pixel 1022 has an area that is not shielded by the shielding block 103, so that the first pixel 1022 has the corresponding area uniformity. The area uniformity of the first pixel 1022 is related to areas of a third sub-pixel and a fourth sub-pixel in the first pixel 1022 in the display region 01. The third sub-pixel is the sub-pixel of the corresponding first pixel 1022, which has a largest area unshielded by the shielding block 103. The fourth sub-pixel is the sub-pixel of the corresponding first pixel 1022, which has a smallest area unshielded by the shielding block 103. The area uniformity of the first pixel 1022 is [1−(S3−S4)/(S3+S4)], wherein S3 is an area of the third sub-pixel unshielded by the shielding block 103, and S4 is an area of the fourth sub-pixel unshielded by the shielding block 103. The area uniformity of the first pixel is greater than 0.9 and less than or equal to 1.

A range of the area uniformity of the first pixel 1022 is smaller than the area uniformity of the pixel, which means that areas of the sub-pixels 10211 in the first pixel 1022 unshielded by the shielding block 103 have small differences. By means of the above configuration of the shielding block 103, a color shift problem at the edge of the special-shaped display can be improved.

According to one embodiment of the present application, the third sub-pixel can be the first sub-pixel 10212, and the fourth sub-pixel can be the second sub-pixel 10213. For example, for each of the first pixels 1022, an area S2 of the second sub-pixel 10213 in the first pixel 1022 in the display region 01 can be used as a standard, so that an error between the S2 and an area of the second sub-pixel 1022 unshielded by the shielding block 103 is within a predetermined error range. At the same time, areas of the other sub-pixels of the first pixel 1022 unshielded by the shielding block 103 all satisfy the range of the area uniformity.

S50: if it is determined that the area uniformity of the pixel 1021 is outside the first predetermined range, defining the pixel 1021 as a second pixel 1023, and setting brightness of the second pixel 1023 according to an area of the second pixel 1023 in the display region 01.

According to one embodiment of the present application, brightness of the second pixel 1023 can be increased according to an increase in the area of the second pixel 1023 in the display region 01. For example, for the second pixels 1023, a ratio of the brightness of each second pixel 1023 to the area of the second pixel 1023 in the display region 01 is equal. Further, the brightness of the second pixel 1023 can include brightness of each of the sub-pixels 10211, and the brightness of each of the sub-pixels 10211 can be set according to the area of the sub-pixel 10211 in the display region 01. For example, the brightness of each of the sub-pixels 10211 can be increased according to an increase in the area of the sub-pixel 10211 in the display region 01. A ratio of the brightness of each sub-pixel 10211 to an area of each sub-pixel in the display region 01 is equal. For more details, please refer to the following embodiments.

According to one embodiment of the present application, by controlling a magnitude of a driving voltage applied to each of the sub-pixels 10211 in the second pixel 1023, a magnitude of a grayscale value of each of the sub-pixels 10211 in the second pixel 1023 is controlled to provide different brightness levels.

According to one embodiment of the present application, by controlling an aperture size of a light filter arranged on the second pixel 1023, an amount of light transmitted through each of the sub-pixels 10211 in the second pixel 1023 is controlled to provide different brightness levels.

According to one embodiment of the present application, by controlling a length of each of the sub-pixels 10211 in the second pixel 1023, an amount of light emitted from or transmitted through each of the sub-pixels 10211 in the second pixel 1023 is controlled to provide different brightness levels.

It should be noted that, as shown in FIG. 4, the pixels 1021 comprises a main pixel 10214 and a subsidiary pixel 10215. The main pixel 10214 is disposed above the subsidiary pixel 10215, and a height of the main pixel 10214 is less than a height of the subsidiary pixel 10215. When the display panel 100 has low brightness, the main pixel 10214 and the sub-pixel 10215 in each of the pixels 1021 are respectively in an ON state and an OFF state. It can be understood that, for the pixel 1021 on the boundary line 03, if the boundary line is close to the main pixel 10214, burrs occur when the pixel 1021 uses the above-mentioned configuration for the second pixel 1023, so the pixel 1021 uses the above-mentioned configuration for the first pixel 1022.

The "low brightness" and "close" described in the present disclosure can be defined according to actual conditions.

In one embodiment of the present application, as shown in FIG. 5, the non-display region 02 in the display panel 100 is arranged around the display region 01, and the boundary line 03 used to separate the non-display region 02 and the display region 01 a closed curve. The boundary line 03 includes arcs 030 located at four corners of the display panel 100. The arc 030 can be a ¼ arc, a diagonal line 04 is used to divide the corresponding arc 030 into two equal parts, and the diagonal line 04 divides the boundary line 03 into a first sub-boundary line 031, a second sub-boundary line 032, a third sub-boundary line 033, and a fourth sub-boundary line 034, as shown in the drawing. In summary, the pixel 1021 on the first sub-boundary line 031 and the third sub-boundary line 033 can use the configuration for the second pixel 1023. The pixel 1021 on the second sub-boundary line 032 can use the configuration for the first pixel 1022. The pixel 1021 on the fourth sub-boundary line 034 can select the configuration for the first pixel 1022 or the second pixel 1023 according to a distance between the main pixel 10214 of the pixel 1021 and the fourth sub-boundary line 034.

The present application provides a display panel, a manufacturing method thereof, and a display device. The display panel and the display device both comprises a display region and a non-display region separated by a boundary line. Each of pixels divided by the boundary line comprises a plurality of sub-pixels. According to areas of the sub-pixels in the display region, each pixel has corresponding area uniformity. According to whether the area uniformity is within a first predetermined range, a shielding block is arranged on the pixel, or brightness of the pixel is set according to an area of the pixel in the display region. This way, the present application solves a problem that jagged images appear at an edge of a special-shaped display and improves the display quality of the display panel.

What is claimed is:

1. A display panel comprising a display region and a non-display region, the display region and the non-display region separated by a boundary line, the display panel comprising:
a substrate;
a plurality of pixels disposed on the substrate, wherein the pixels are divided by the boundary line, a portion of each of the pixels is disposed in the display region, the other portion of each of the pixels is disposed in the non-display region, each of the pixels comprises a plurality of sub-pixels, and each of the sub-pixels has an area located in the display region, so that each pixel has corresponding area uniformity;
the pixels comprising:
a plurality of first pixels, wherein the area uniformity of the first pixel is within a first predetermined range, and a shielding block is disposed on the first pixel, wherein at least a portion of the shielding block is disposed in the non-display region, the shielding block shields the first pixel by using S/M as a minimum unit, wherein S is an area of the first pixel, and M is within a second predetermined range; and
a plurality of second pixels, wherein the area uniformity of the second pixel is outside the first predetermined range, and brightness of the second pixel is set according to an area of the second pixel in the display region.

2. The display panel according to claim 1, wherein the area uniformity of the pixel is $[1-(S1-S2)/(S1+S2)]$, wherein S1 is an area of a first sub-pixel in the display region, S2 is an area of a second sub-pixel in the display region, the first sub-pixel of each pixel is the sub-pixel having a largest area in the display region, and the second sub-pixel of each pixel is the sub-pixel having a smallest area in the display region.

3. The display panel according to claim 2, wherein the first predetermined range is greater than 0.7 and is less than or equal to 1.

4. The display panel according to claim 1, wherein the second predetermined range is between 4, 9, or 16.

5. The display panel according to claim 1, wherein a section where the shielding block on the boundary line is a minimum unit has a target ratio, the target ratio is an area of the corresponding section in the display region to an area of the corresponding section in the non-display region, and the target ratio of the section is less than 1.

6. The display panel according to claim 1, wherein each of the first pixels has area uniformity, and the area uniformity of the first pixels is $[1-(S3-S4)/(S3+S4)]$, wherein S3 is an area of a third sub-pixel unshielded by the shielding block, and S4 is an area of a fourth sub-pixel unshielded by the shielding block, wherein the third sub-pixel is the sub-pixel of the corresponding first pixel, which has a largest area unshielded by the shielding block, wherein the fourth sub-pixel is the sub-pixel of the corresponding first pixel, which has a smallest area unshielded by the shielding block.

7. The display panel according to claim 6, wherein the area uniformity of the first pixel is greater than 0.9 and is less than or equal to 1.

8. A display device, the display device comprising a display panel, the display panel comprising a display region and a non-display region, the display region and the non-display region separated by a boundary line, the display panel comprising:
a substrate;
a plurality of pixels disposed on the substrate, wherein the pixels are divided by the boundary line, a portion of each of the pixels is disposed in the display region, the other portion of each of the pixels is disposed in the non-display region, each of the pixels comprises a plurality of sub-pixels, and each of the sub-pixels has an area located in the display region, so that each pixels have corresponding area uniformity;
the pixels comprising:
a plurality of first pixels, wherein the area uniformity of the first pixel is within a first predetermined range, and a shielding block is disposed on the first pixel, wherein at least a portion of each of the shielding blocks is disposed in the non-display region, the shielding block shields the first pixel by using S/M as a minimum unit, wherein S is an area of the first pixel, and M is within a second predetermined range; and
a plurality of second pixels, wherein the area uniformity of the second pixel is outside the first predetermined range, and brightness of the second pixel is set according to an area of the second pixel in the display region.

9. The display device according to claim 8, wherein the area uniformity of the pixel is $[1-(S1-S2)/(S1+S2)]$, wherein S1 is an area of a first sub-pixel in the display region, S2 is an area of a second sub-pixel in the display region, the first sub-pixel of each pixel is the sub-pixel having a largest area in the display region, and the second sub-pixel of each pixel is the sub-pixel having a smallest area in the display region.

10. The display device according to claim 9, wherein the first predetermined range is greater than 0.7 and less than or equal to 1.

11. The display device according to claim 8, wherein the second predetermined range is a range between 4, 9, or 16.

12. The display device according to claim 8, wherein a section where the shielding block on the boundary line is a minimum unit has a target ratio, the target ratio is an area of the corresponding section in the display region to an area of the corresponding section in the non-display region, and the target ratio of the section is less than 1.

13. The display device according to claim 8, wherein each of the first pixels has area uniformity, and the area uniformity of the first pixel is $[1-(S3-S4)/(S3+S4)]$, wherein S3 is an area of a third sub-pixel unshielded by the shielding block, and S4 is an area of a fourth sub-pixel unshielded by the shielding block, wherein the third sub-pixel is the sub-pixel of the corresponding first pixel, which has a largest area unshielded by the shielding block, wherein the fourth sub-pixel is the sub-pixel of the corresponding first pixel, which has a smallest area unshielded by the shielding block.

14. The display device according to claim 13, wherein the area uniformity of the first pixel is greater than 0.9 and is less than or equal to 1.

15. A manufacturing method of a display panel, the display panel comprising a display region and a non-display region, the display region and the non-display region separated by a boundary line, the manufacturing method comprising:

providing a substrate;

forming a plurality of pixels on the substrate, wherein the pixels are divided by the boundary line, a portion of each of the pixels is formed in the display region, the other portion of each of the pixels is formed in the non-display region, each of the pixels comprises a plurality of sub-pixels, and each of the sub-pixels has an area located in the display region, so that each pixel has corresponding area uniformity;

determining whether the area uniformity of the pixel is within a first predetermined range, wherein the area uniformity of the pixel is $[1-(S1-S2)/(S1+S2)]$, wherein S1 is an area of the first sub-pixel in the display region, and S2 is an area of the second sub-pixel in the display region;

if it is determined that the area uniformity of the pixel is within the first predetermined range, defining the pixel as a first pixel, and forming a shielding block on the first pixel; and if it is determined that the area uniformity of the pixel is outside the first predetermined range, defining the pixel as a second pixel, and setting brightness of the second pixel according to an area of the second pixel in the display region.

16. The manufacturing method of the display panel according to claim 15, wherein the area uniformity of the pixel is related to an area of the first pixel of the pixel in the display region and an area of the second pixel of the pixel in the display region, the first sub-pixel of each pixel is the sub-pixel having a largest area in the display region, and the second sub-pixel of each pixel is the sub-pixel having a smallest area in the display region.

17. The manufacturing method of the display panel according to claim 15, wherein the first predetermined range is greater than 0.7 and is less than or equal to 1.

\* \* \* \* \*